United States Patent
Farshchian et al.

(10) Patent No.: US 9,335,751 B1
(45) Date of Patent: May 10, 2016

(54) DYNAMIC PERFORMANCE BASED COOLING CONTROL FOR CLUSTER PROCESSING DEVICES

(71) Applicant: Google Inc., Mountain View, CA (US)

(72) Inventors: Soheil Farshchian, San Jose, CA (US); Jeremy Rice, San Jose, CA (US)

(73) Assignee: Google Inc., Mountain View, CA (US)

( * ) Notice: Subject to any disclaimer, the term of this patent is extended or adjusted under 35 U.S.C. 154(b) by 440 days.

(21) Appl. No.: 14/012,537

(22) Filed: Aug. 28, 2013

(51) Int. Cl.
*G05B 15/02* (2006.01)
*G06F 1/20* (2006.01)
*G06F 11/30* (2006.01)

(52) U.S. Cl.
CPC ............... *G05B 15/02* (2013.01); *G06F 1/206* (2013.01); *G06F 11/3058* (2013.01); *Y02B 60/1275* (2013.01)

(58) Field of Classification Search
CPC ..... G05B 15/02; G06F 1/206; G06F 11/3058; Y02B 60/1275
USPC .................................................. 700/299–300
See application file for complete search history.

(56) References Cited

U.S. PATENT DOCUMENTS

| | | | |
|---|---|---|---|
| 8,301,315 B2 | 10/2012 | Dawson et al. | |
| 8,346,398 B2 | 1/2013 | Ahmed et al. | |
| 2002/0147932 A1* | 10/2002 | Brock et al. | 713/300 |
| 2006/0184815 A1* | 8/2006 | Ha et al. | 713/500 |
| 2009/0271046 A1* | 10/2009 | Lewis et al. | 700/291 |
| 2010/0100254 A1* | 4/2010 | Artman et al. | 700/299 |
| 2010/0256959 A1 | 10/2010 | VanGilder et al. | |
| 2012/0017104 A1* | 1/2012 | Siba et al. | 713/323 |
| 2012/0053734 A1* | 3/2012 | Kazama et al. | 700/275 |
| 2014/0226280 A1* | 8/2014 | Alshinnawi et al. | 361/679.49 |

OTHER PUBLICATIONS

Evans, Tony "White Paper 59, Revision 2" Schneider Electric—Data Center Science Center, 2012 (online) (retrieved on Jul. 25, 2013 ). Retrieved from the internet: http://www.yumpu.com/en/document/view/4142035/vavr-5udtu5-r2-en, 16 pages.
Wang and Chen, "Cluster-level feedback power control for performance optimization." (online) (retrieved on Jul. 19, 2013). Retrieved from internet: http://web.eecs.utk.edu/~xwang/papers/hpca08.pdf. IEEE 14th International Symposium on High Performance Computer Architecture, HPCA 2008, 10 pages.

* cited by examiner

*Primary Examiner* — Carlos Ortiz Rodriguez
*Assistant Examiner* — Jason Lin
(74) *Attorney, Agent, or Firm* — Fish & Richardson P.C.

(57) ABSTRACT

Methods, systems, and apparatus for cooling control in a datacenter. In one aspect, a method includes, for each processing device in a cluster of processing devices configured to perform a distributed task, wherein each processing device is thermally controlled by a cooling system that controls cooling to each processing device on an individual basis, determining whether the processing device is operating within a performance target for the cluster of processing devices; for each processing device determined to not be operating within the performance target for the cluster, generating a respective control signal to adjust the cooling delivery to the processing device to cause the performance of the processing device to be within the performance target for the cluster of processing devices; and for each processing device determined to be operating within the performance target for the cluster, maintaining the cooling delivery to the processing device.

16 Claims, 4 Drawing Sheets

DYNAMIC PERFORMANCE BASED COOLING CONTROL FOR CLUSTER PROCESSING DEVICES

TECHNICAL FIELD

This document relates to data centers cooling.

BACKGROUND

Data centers are often used by providers to deliver Internet services to users. A data center, such as a server farm, typically contains hundreds or thousands of processing devices. Within the data centers the processing devices are arranged in clusters. Each cluster is configured to perform a distributed task in a parallel fashion.

In a cluster in which processing devices parallel process a task, the latency of the cluster is driven by the slowest machine in the cluster. While the processing devices performing the task for the cluster might be similar or even exactly the same in design, the variations in operating conditions, manufacturing tolerances, silicon frequency yield, etc., may result in a significant distribution of machine performance. These performance differences in processing components correlate to the core frequency of the silicon. One method to improve the silicon frequency is to reduce the temperature of the package. The reduction in temperature reduces leakage current and enables the processing device to run at a higher frequency than it could otherwise run at a higher temperature.

SUMMARY

In general, one innovative aspect of the subject matter described in this specification can be embodied in methods that include the actions for each processing device in a cluster of processing devices configured to perform a distributed task, wherein each processing device is thermally controlled by a cooling system that controls cooling to each processing device on an individual basis, determining, by a cooling system control device that controls the cooling system, whether the processing device is operating within a performance target for the cluster of processing devices; for each processing device determined to not be operating within the performance target for the cluster, generating, by the cooling system control device, a respective control signal to adjust the cooling delivery to the processing device to cause the performance of the processing device to be within the performance target for the cluster of processing devices; and for each processing device determined to be operating within the performance target for the cluster, maintaining the cooling delivery to the processing device. Other embodiments of this aspect include corresponding systems, apparatus, and computer programs, configured to perform the actions of the methods, encoded on computer storage devices.

Another innovative aspect of the subject matter described in this specification can be embodied in methods that include for each processing device in a cluster of processing devices configured to perform a distributed task, wherein each processing device is thermally controlled by a cooling system that controls cooling to disjoint sets processing devices on a disjoint set basis, determining, by a cooling system control device that controls the cooling system, whether the processing device is operating within a performance target for the cluster of processing devices; for each disjoint set of processing devices that includes a first processing device determined to not be operating within the performance target and operating below the performance target for the cluster, generating, by the cooling system control device, a respective control signal to increase the cooling delivery to the disjoint set of processing devices to cause the performance of the first processing device to increase and be within the performance target for the cluster of processing devices; and for each disjoint set of processing devices in which each processing device is determined to be operating within the performance target for the cluster, maintaining the cooling delivery to the disjoint set of processing devices. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Boosting performance only on under-performing processing devices reduces overall cooling resource allocation to a cluster, which, in turn, reduces power consumption and attendant costs. Furthermore, reducing cooling resources allocated to over-performing processing devices provides additional savings without impacting the overall performance of the cluster.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

The cost of thermal cooling of a processing device increases with diminishing returns. Therefore, it may be uneconomical to boost cooling on all processing devices in a cluster. The subject matter described in this document takes into account the diminishing return curve by detecting the slower tail-end under-performing processing devices of a cluster and providing additional cooling to those processing devices to increase overall performance of the entire cluster. Additionally, cooling resources for over-performing machines may be de-allocated without adversely affecting overall performance of the cluster.

Given that the performance of the cluster is dominated by the highest latency machines, a system implementing the subject matter of this document allocates cooling resources in a highly efficient manner. Furthermore, because the performance of the cluster is dominated by the highest latency machines, the overall performance is relatively immune from performance decreases in over-performing processing devices. Thus, a system implementing the subject matter of this document further increases efficiency by de-allocating cooling resources when such de-allocations do not result in appreciable overall performance decreases for the cluster.

These features and other features are described in more detail below.

Figure 1A:
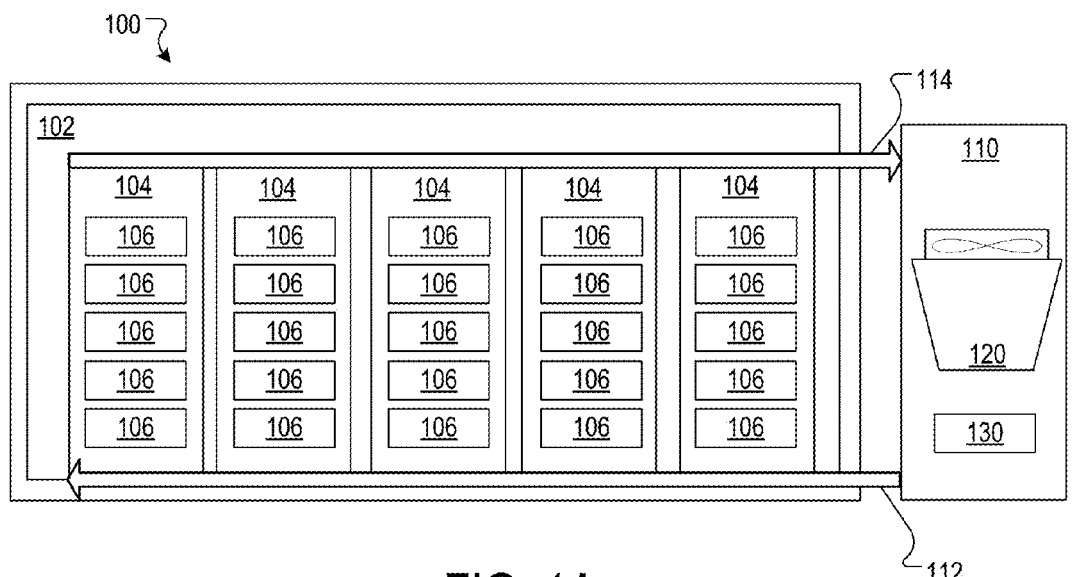
FIGS. 1A and 1B are sectional side and top views of a data center facility.
Figure 1B:
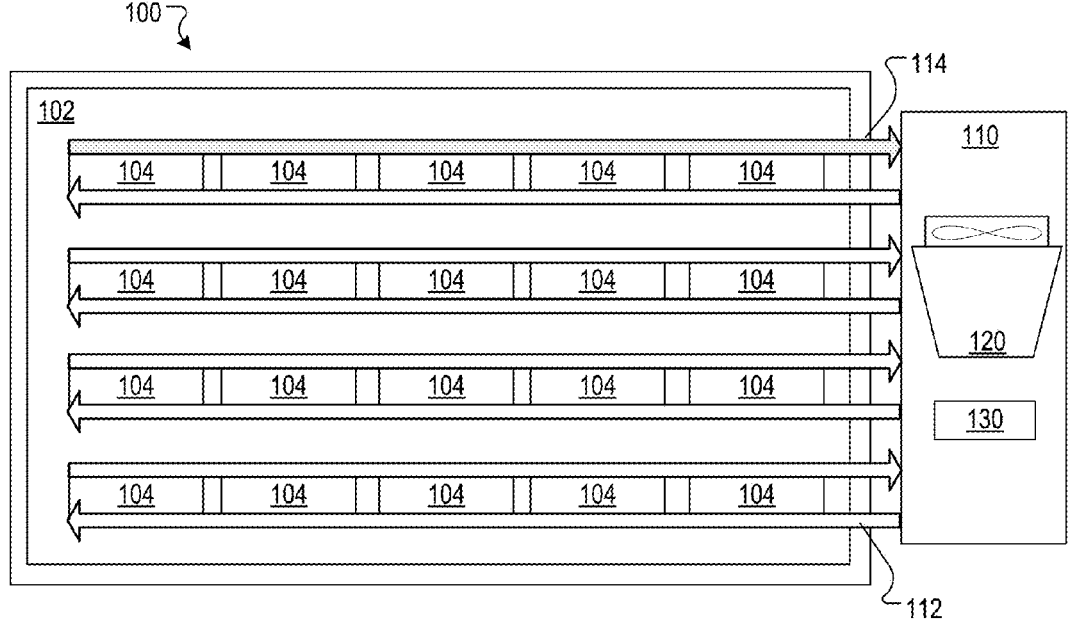

FIGS. 1A and 1B are sectional side and top views of a data center facility 100. The facility 100 includes an enclosed space 102 and can occupy one or more rooms within a building or essentially an entire building. The enclosed space 102 is sufficiently large for installation of numerous (e.g., dozens or hundreds or thousands) racks 104 of computer equipment, and may house hundreds, thousands or tens of thousands of computer processing devices.

The rack-mounted computers are arranged in the space 102 in rows and are separated by aisles. Each rack 104 includes multiple processing devices 106. In general, each processing device 106 includes a motherboard, on which a variety of computer-related components are mounted. The facility 100 includes other computer and routing devices (not shown) to connect the facility to a network, such as the Internet.

The facility 100 is also connected to a power grid (not shown) to power the processing devices 106. Each processing device 106 generates heat while operating. A cooling system 110 thermally controls the processing devices 106. The cooling system 110 is depicted as providing thermal control to the processing devices by couplings 112 and 114. The type of couplings 112 and 114 utilized will depend on the type of cooling system utilized. For example, the cooling system 110 may control fans on each processing device 106, and provide for cold air supply 112 from a condenser 120 and hot air return 114 to the condenser. Likewise, the cooling system may be a liquid cooled system that provides for coolant supply 112 and coolant return 114. Other appropriate cooling systems 110 may also be utilized, and the cooling system need not have a return or supply, depending on the thermal system being used.

The cooling system 110 includes a control device 130, such as a data processing apparatus, that can control the cooling levels delivered by the cooling system 110 to the devices 106. In particular, for the cluster of devices 106, the cooling system 110 can control the amount of cooling delivered to disjoint proper subsets of the devices 106 that belong to the cluster. The proper subset can be a collection of racks 104, or each rack 104, or, in some implementations, each device 106. Thus, the cooling system 110, in combination with the control device 130, can control the amount of cooling delivered to each proper subset of processing device 106 on an individual proper subset basis.

For example, when controlling cooling delivered to each processing device 106 on an individual rack 104 basis, the cooling system can adjust cooling provided to each rack 104 so that each rack 104 receives a different level of thermal cooling. How the adjustment is accomplished depends on the type of cooling system 110 implemented. For example, for an air-cooled system, fan speeds on the rack can be increased or decreased, or a damper/blockage may be opened or closed; for a liquid-cooled system, coolant flow for the rack can be increased or decreased or the speed of a pump for the rack may be increased or decreased.

Likewise, when controlling cooling delivered to each processing device 106 on an individual processing device 106 basis, the cooling system can adjust cooling provided to each device 106 so that each device 106 within a rack 104 receives a different level of thermal cooling. Again, how the adjustment is accomplished depends on the type of cooling system 110 implemented. For example, for an air-cooled system, fan speeds for each device 106 tray can be increased or decreased; for a liquid-cooled system, coolant flow for each device 106 tray can be increased or decreased.

Adjustments to cooling are controlled by the control device 130, which generates appropriate electrical signals that cause the cooling delivery to each rack 104 or each device 106, as appropriate, to vary. The electrical signals generated by the control device 130 are used to adjust appropriate electro-mechanical devices that are used to control the cooling for each controlled entity (e.g., rack or device). Examples of electro-mechanical devices include fans, pumps, air baffles, and valves.

The control device 130 is in electrical communication with devices 106 and can gather data from the devices 106 to assess the load of each device and the performance of each device. Alternatively, the control device 130 communicates with an interface that, in turn, can gather the data from the devices 106. Using this data, the control device 130 monitors the performance of each device 106 on a cluster basis, and compares the performance of the device 106 to the overall performance of the cluster. Operation of the control device 130 when monitoring the overall cluster performance is described with reference to FIGS. 2 and 3.

Figure 2:
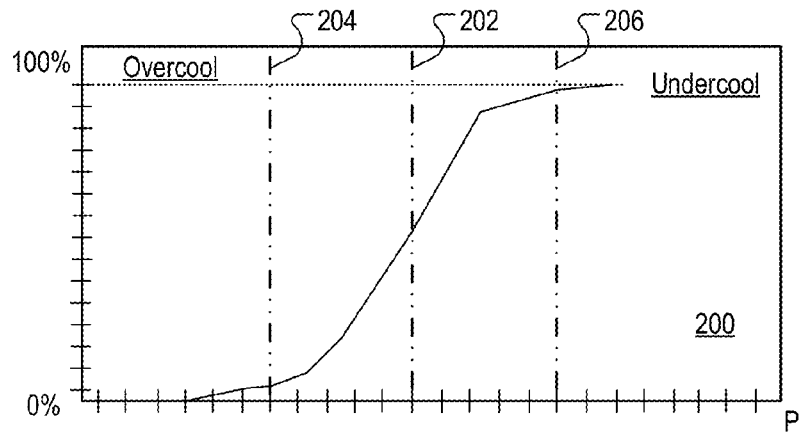
FIG. 2 is a graph of dynamic cooling control system margins for a cluster of processing devices.

FIG. 2 is a graph 200 of dynamic cooling control system margins for a cluster of processing devices. The graph 200 provides a sample cumulative distribution function of the percentage of devices operating at performance measures P.

The distribution is based on a target performance measure 202 for a cluster, and a corresponding lower performance margin 204 and upper performance margin 206. The target performance measure 202 and the margins 204 and 206 can be determined in a variety of ways. In some implementations, the target performance measure 202 can simply be the rated operating frequency of a processing device, e.g., if a cluster consists of processing devices rated to operate at 3.3 GHz, then the target frequency is 3.3 GHz. In other implementations, the target performance measure 202 can be determined empirically for each cluster of processing devices 106. Examples of such empirical determination are described with reference to FIGS. 4 and 5 below.

The margins 204 and 206 can be based on a minimum percentage under the target performance measure 202 and a maximum percentage over the target performance measure. The percentages can be fixed, e.g., M % under the target performance measure 202 and N % over the target performance measure 202, where M and N can be the same or different values.

Alternatively, the percentages can vary based on the cluster performance. For example, the lower performance margin 204 may be selected such that devices that operate in the fifth percentile of performance have performance measures that are less than the lower performance margin 204, and the upper performance margin 206 may be selected such that devices that operate in the ninetieth percentile of performance have performance measures that are greater than the upper performance margin 204. In the case of percentiles, the target performance measure 202 need not be determined. Other percentages and percentiles can also be used.

Figure 3:
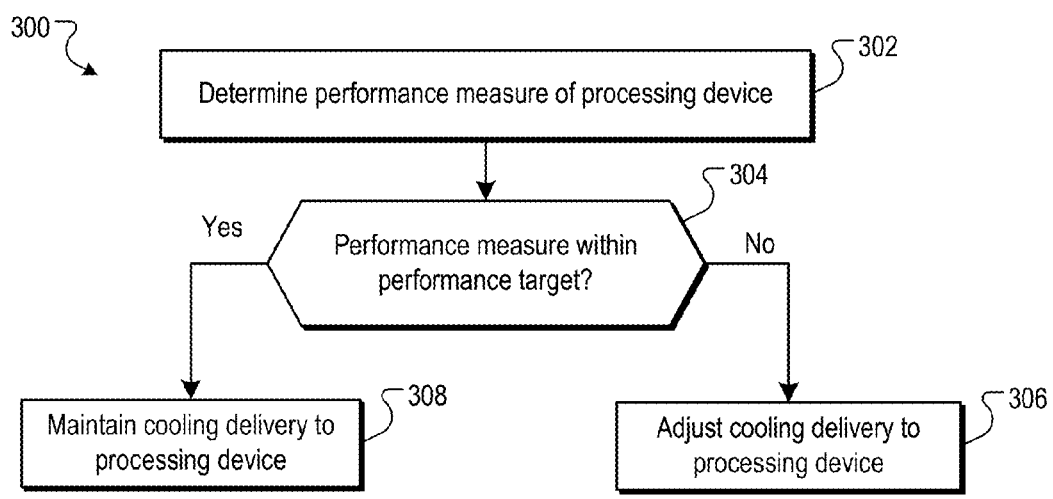
FIG. 3 is a flow diagram of an example process for performance based cooling of processing devices within a cluster.

FIG. 3 is a flow diagram of an example process 300 for performance based cooling of processing devices 106 within a cluster. The process 300 is implemented in the control device 130 that controls the cooling system 110. The process 300 is also described with reference to a single processing device 106, but in operation the process 300 is performed for each processing device 106 in a cluster.

The process 300 determines the performance measure of a processing device 106 (302). The performance measure is a value that quantifies a level of performance of the processing device. The value can, for example, be an operating frequency when the processing device 106 is under load. One example way of determining the performance measure based on an operating frequency is described with reference to FIG. 4 below.

Other performance measures can also be used. For example, the performance measure can be a number of instructions per unit time, or any other appropriate metric value that is temperature dependent and by which the performance of the processing device 106 can be evaluated.

The process 300 determines whether the performance measure of the processing device 106 is within a performance target for the cluster of processing devices (304). The performance value is specific to the cluster of processing devices where the processing devices perform a distributed task. The performance target can, for example, be a range of values. The range can be based on a target performance measure, such as the lower and upper margins 204 and 206 that are based on a minimum percentage under the target performance measure 202 and a maximum percentage over the target performance measure 202 of FIG. 2.

For example, if the performance measure is an operating frequency, the control device 130 determines whether the operating frequency measure of the processing device 106 is within a frequency range of the target performance measure 202. The range of the target performance measure may be based on an average target operating frequency for the cluster. If the operating frequency measure of the processing device 106 is greater than a minimum percentage less than the target operating frequency and less than a maximum percentage greater than the target operating frequency, then the performance measure of the processing device 106 is within a performance target for the cluster of processing devices.

Alternatively, range can be based on percentile performance ranges, such that devices that operate in the fifth percentile of performance have performance measures that are less than the lower performance margin 204, and devices that operate in the ninetieth percentile of performance have performance measures that are greater than the upper performance margin 204. For percentile performance rages, the lower and upper margins 204 and 206 may be independent of the target performance measure 202.

If the performance measure of the processing device 106 is not within the performance target, the process 300 adjusts cooling delivery to the processing device 106 (306). The adjustment will depend on whether the processing device 106 is operating below the lower margin 204 or above the upper margin 206. If the processing device is operating below the lower margin 204, the control device 130 generates a control signal to increase cooling delivery to the processing device 106. Conversely, if the processing device 106 is operating above the upper margin 206, then the control device 130 generates a control signal to decrease cooling delivery to the processing device 106.

Adjustment of the cooling delivery may be conditioned on the size of the proper subset of devices 106 for which cooling is controlled for each adjustment. In the case of cooling for each processing device 106 being individually controlled on a per-device basis (i.e., the cardinality of the proper subset is 1), then the adjustment is dependent only on the performance of the processing device 106. However, if the proper subset includes multiple processing devices 106, then the adjustment may depend on the performance of other processing devices 106 in the proper subset. For example, for a proper subset of N devices, where N is greater than 1, assume that one device in the proper subset is operating below the lower margin 204, and all the other devices 106 are operating above the lower margin 204. In this situation, cooling to the entire proper subset can be increased, as increasing cooling to the other devices will not adversely impact the respective performance of each device 106. Conversely, assume that one device 106 in the proper subset is operating above the upper margin 206, and all the other devices 106 are operating above the lower margin 204 and below the upper margin 206. In this situation, decreasing cooling to the entire proper subset may be precluded, so as to avoid adversely impact the respective performance of each other device 106. Alternatively, cooling can be slightly decreased and performance of each device 106 in the proper subset can be reassessed. Thereafter, if the one device 106 in the proper subset is still operating above the upper margin 206, and all the other devices 106 are still operating above the lower margin 204, cooling can again be decreased slightly and the performance of each device 106 in the proper subset reassessed. Cooling and reassessment continues until one of the following occurs: performance of one of the devices 106 in the proper subset approaches, but does not fall below, the lower margin 204; or performance of the device 106 operating above the upper margin 206 falls below the upper margin 206.

After cooling is adjusted, the control device 130 may delay further evaluation of the processing device 106 until the processing device reaches a new ambient temperature. The delay can be time based, e.g., a fixed number of minutes, or based on some other heuristic. The delay can also be based on temperature readings reported from the device 106, if the device is configured to provide such readings.

If, after a number of cooling adjustments or after a maximum level of cooling is applied, a particular device 106 continues to under-perform, the control device 130 may flag the processing device 106 for inspection or take the processing device 106 off line.

Conversely, if the performance measure of the processing device 106 is within the performance target, then the process 300 maintains cooling delivery to the processing device 106 (306).

Figure 4:
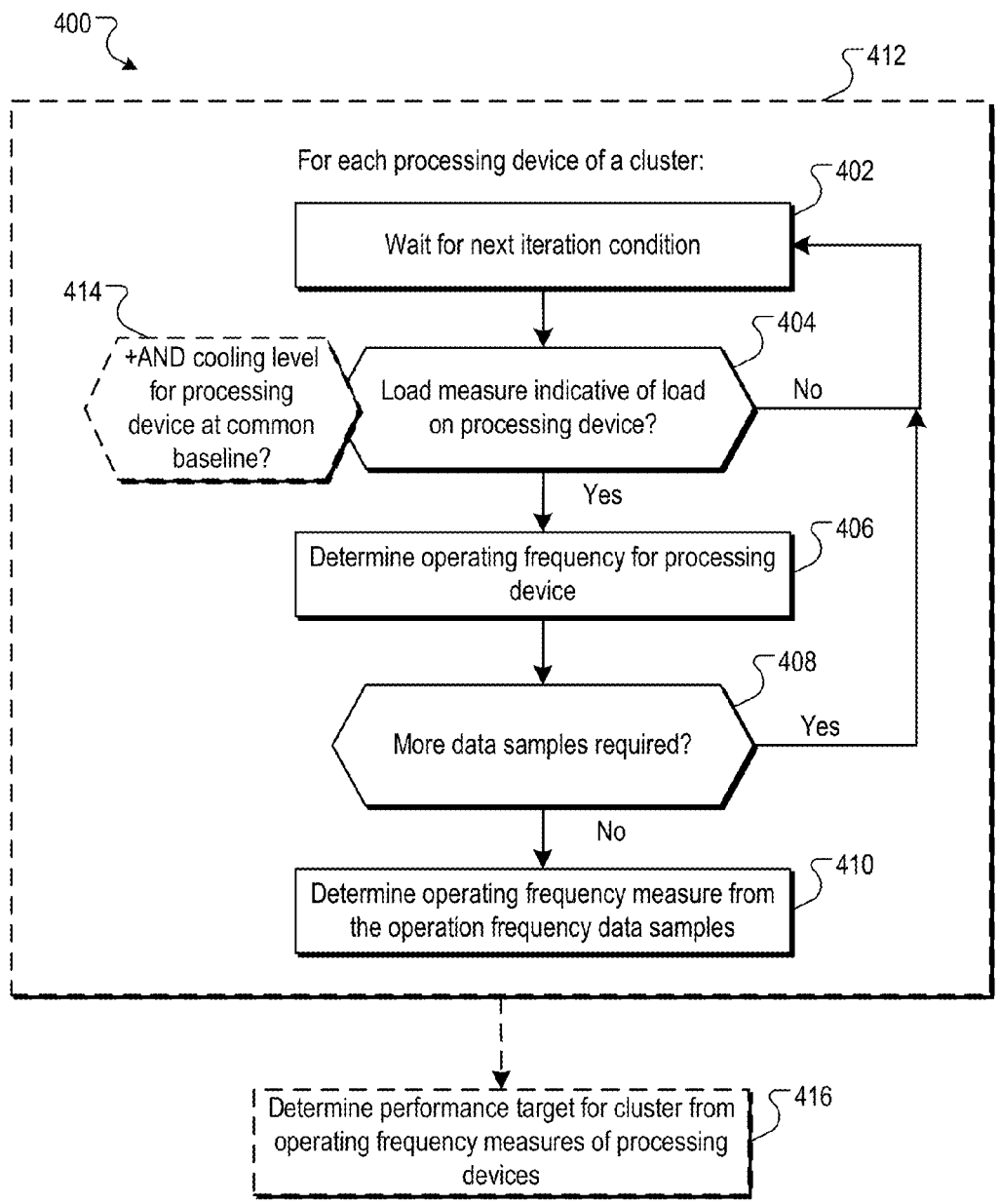
FIG. 4 is a flow diagram of an example process for determining a performance measure of a processing device.

FIG. 4 is a flow diagram of an example process 400 for determining a performance measure of a processing device. The process 400 is implemented in the control device 130 that controls the cooling system 110. The process 400 is also described with reference to a single processing device 106, but in operation the process 400 is performed for each processing device 106 in a cluster.

The process 400 waits for an iteration condition (402). For example, when the performance measure is operating frequency, the control device 130 may be programmed to collect 100 frequency samples, with one sample collection being attempted every N seconds.

When the iteration condition occurs, the process 400 determines if a load measure of a processing device 106 is indicative of a load on the processing device 106 (404). If the processing device 106 is only lightly loaded or not loaded, then a frequency sample is not collected, as the processor may have reduced its operating frequency to conserve power.

Any appropriate load measure can be used. In some implementations, the load measure is a power consumption level for the processing device, and is indicative of a load on the processing device 106 when the power level meets a threshold power consumption level. One example level can be 80% of the rated power of the processing device. Other thresholds can also be used.

If the load measure of the processing device 106 is not indicative of a load on the processing device 106, then the process 400 waits for the next iteration condition (402). Discounting operating frequencies for processing devices 106 not at load eliminates biasing the performance target for a cluster at a low level.

Conversely, if the load measure of the processing device 106 is indicative of a load on the processing device 106, then the process 400 determines an operating frequency for the processing device (406).

The process 400 determines if more data samples are required (408). If more data samples are required, then the process 400 waits for the next iteration condition (402). Conversely, if the process 400 has collected enough data samples to determine an operating frequency measure for the processing device, then the process 400 determines the operating frequency measure for the processing device from the operating frequency data samples taken for the processing device 106 (410). The operating frequency measure for the processing device 106 may be a central tendency (e.g., a mean or median) of the operating frequencies collected for the processing device 106.

The operating frequency measure of the processing device 106 is then compared to the performance target range of frequencies for the cluster, as described above. Appropriate adjustments, if any are required, are then made by the control device 130.

In some implementations, the process 400 can be performed on the processing devices 106 of a cluster to determine the performance target for the cluster. To avoid biasing the performance target either too high or too low, the process 400 can first cool all processing devices 106 at a baseline cooling level. A baseline cooling level is a cooling level that is a default cooling level for a normally operating processing device 106 that is operating within the performance margins 204 and 206 without overcooling or undercooling.

In operation, the process 400 decision 404 is modified to be further conditioned on the processing device 106 being cooled at a common baselines level (414). This is done for each processing device (412), e.g., during a cluster initialization or by resetting all cooling of all processing devices 106 in the cluster to a baseline level and allowing each processing device 106 to reach a steady state temperature.

Thereafter, operating frequency measures are obtained for the processing devices of the cluster, the performance target for the cluster is then determined (416). The performance target can, for example, be based on a central tendency of the operating frequencies, e.g., a mean or a median. To illustrate, the central tendency may be the target performance measure 202, and the performance target may the range defined by the percentage of the performance target 202, e.g., the lower margin 204 may be 90% of the target performance measure 202, and the upper margin 206 may be 110% of the target performance measure 202.

Alternatively, the performance target can be upper and lower percentile frequencies at which an upper percentage of processing devices operate at frequencies exceeding the upper percentile frequency and at which a lower percentage of processing devices operate at frequencies less than the lower percentile frequency. Other performance targets can also be determined.

Figure 5:
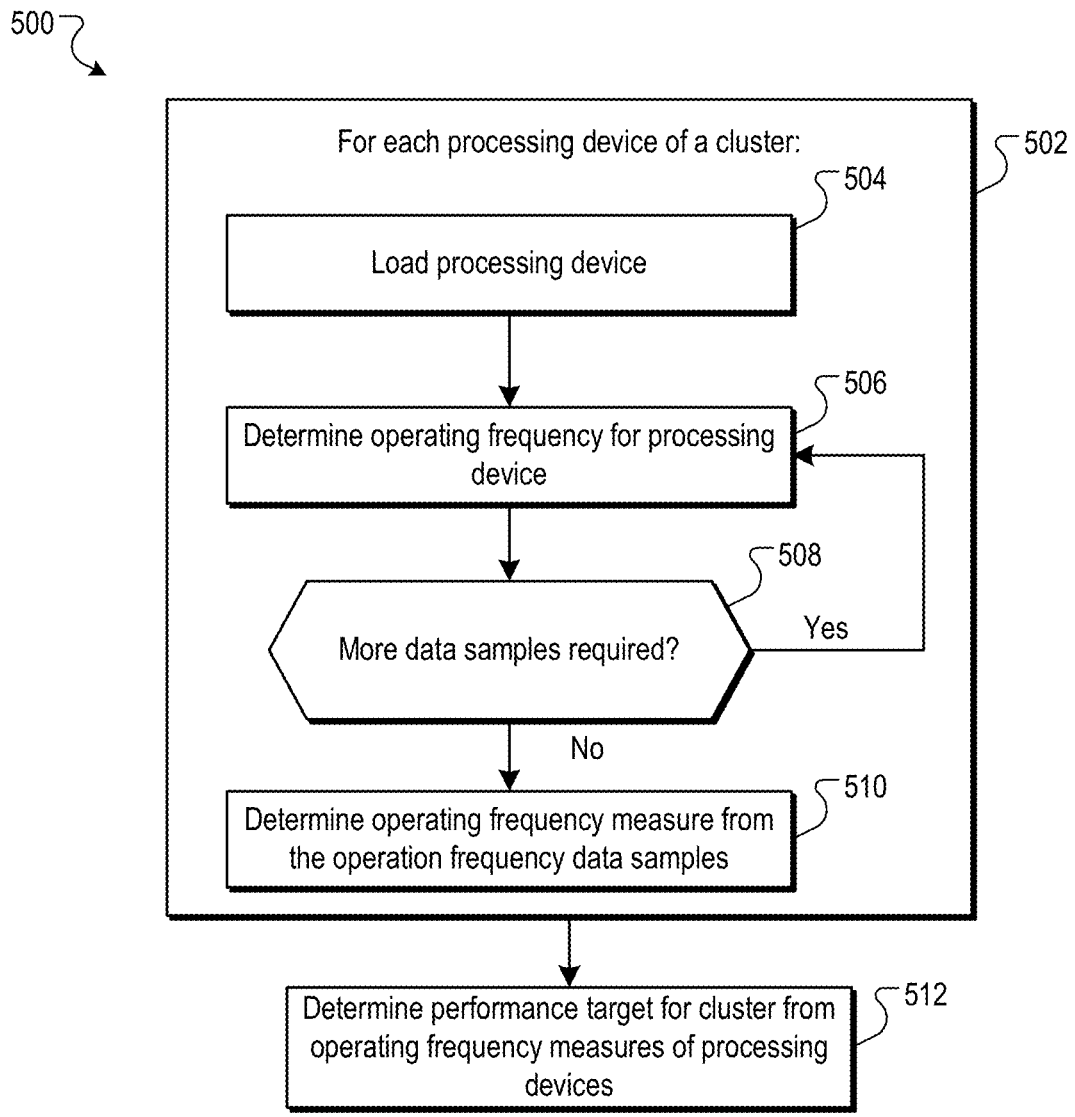
FIG. 5 is a flow diagram of an example process of determining a performance target for a cluster of processing devices.

Another way to determine the performance target for a cluster is to simulate device loading. FIG. 5 is a flow diagram of an example process 500 of determining a performance target for a cluster of processing devices. This process 500 can be used to obtain a performance target for a cluster more quickly than the process 400, as the process 500 ensures that the devices 106 are at load, and thus data samples can be collected more quickly than when skipping data samples when processing devices are not at load. The process 500 is implemented in the control device 130 that controls the cooling system 110, and steps within the process box 502 are performed for each processing device of a cluster.

The process 500 loads the processing device (504). For example, the processing devices 106 can each be instructed to perform a benchmark task that is configured to cause the processing device 106 to operate at full load.

The process 500 determines the operating frequency for the processing device (506). The operating frequency is taken when the processing device 106 is operating at load. The process 500 determines if more data samples are required (508). If more data samples are required, then the process 500 again determines the operating frequency for the processing device (506). The process 500 can also wait a certain amount of time, e.g., 30 seconds, before collecting the next data sample.

Conversely, if the process 500 has collected enough data samples to determine an operating frequency measure for the processing device, then the process 500 determines the operating frequency measure for the processing device from the operating frequency data samples taken for the processing device 106 (510). This step is similar to step 410 of FIG. 4.

Thereafter, operating frequency measures are obtained for the processing devices of the cluster, and the performance target for the cluster is then determined (512). This step is similar to step 416 of FIG. 4.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device for displaying information to the user and a keyboard and a pointing device, e.g., a mouse, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
for each processing device in a set of two or more processing devices configured to perform a distributed task, wherein each processing device is thermally controlled by a cooling system that controls cooling to each processing device on an individual basis, determining, by a cooling system control device that controls the cooling system, whether the processing device is operating within a performance target for the set of two or more processing devices, the determining comprising:
   iteratively determining a load measure for the processing device, the load measure being indicative of a load on the processing device;
   for each iteration for which the load measures meet a threshold load measure, determining an operating frequency measure for the processing device; and
   determining whether the processing device is operating within a performance target for the set of two or more processing devices based one or more frequency measures of the processing device, wherein the performance target is a frequency range of a target operating frequency that is based on frequency measures obtained from the set of two or more processing devices operating at a common baseline cooling level;
for each processing device determined to not be operating within the performance target for the set of two or more processing devices, generating, by the cooling system control device, a respective control signal to adjust the cooling delivery to the processing device to cause the performance of the processing device to be within the performance target for the set of two or more processing devices; and
for each processing device determined to be operating within the performance target for the set of two or more processing devices, maintaining the cooling delivery.

2. The computer-implemented method of claim 1, wherein:
   determining whether the operating frequency measure of the processing device is within a frequency range of the target operating frequency comprises determining whether the operating frequency measure of the processing device is no less than a minimum percentage less than the target operating frequency; and
   generating, by the cooling system control device, a respective control signal to adjust the cooling delivery to the processing device comprises generating a control signal to increase cooling delivery to the processing device.

3. The computer-implemented method of claim 1, wherein:
   determining whether the operating frequency measure of the processing device is within a frequency range of the target operating frequency comprises determining whether the operating frequency measure of the processing device is no greater than a maximum percentage greater than the target operating frequency; and
   generating, by the cooling system control device, a respective control signal to adjust the cooling delivery to the processing device comprises generating a control signal to decrease cooling delivery to the processing device.

4. The computer-implemented method of claim 1, wherein:
   determining whether the operating frequency measure of the processing device is within a frequency range of the target operating frequency comprises determining whether the operating frequency measure of the processing device is greater than a minimum percentage less than the target operating frequency and less than a maximum percentage greater than the target operating frequency; and
   generating, by the cooling system control device, a respective control signal to adjust the cooling delivery to the processing device comprises generating a first control signal to decrease cooling delivery to the processing device when the operating frequency is greater than a maximum percentage greater than the target operating frequency and generating a control signal to increase cooling delivery to the processing device when the operating frequency is less than a minimum percentage less than the target operating frequency.

5. The computer-implemented method of claim 1, further comprising determining the target operating frequency from the operating frequencies of the processing devices of the set of two or more processing devices.

6. The computer-implemented method of claim 5, wherein determining the target operating frequency from the operating frequencies of the processing devices of the set of two or more processing devices comprises determining a central tendency of the operating frequencies.

7. The computer-implemented method of claim 6, wherein determining the target operating frequency from the operating frequencies of the processing devices of the set of two or more processing devices comprises determining each of the operating frequencies from frequency measures obtained from processing devices operating at a common baseline cooling level.

8. The computer-implemented method of claim 1, wherein determining a load measure of a processing device comprises determining a power consumption level of the processing device, and wherein the threshold load measure is a threshold power consumption level.

9. A computer-implemented method, comprising:
   for each processing device in a set of two or more processing devices configured to perform a distributed task, wherein each processing device is thermally controlled by a cooling system that controls cooling to disjoint sets of processing devices on a disjoint set basis, determining, by a cooling system control device that controls the cooling system, whether the processing device is operating within a performance target for the set of two or more processing devices, the determining comprising:
      iteratively determining a load measure for the processing device, the load measure being indicative of a load on the processing device;
      for each iteration for which the load measures meet a threshold load measure, determining an operating frequency measure for the processing device; and
      determining whether the processing device is operating within a performance target for the set of two or more processing devices based one or more frequency measures of the processing device, wherein the performance target is a frequency range of a target operating frequency that is based on frequency measures obtained from the set of two or more processing devices operating at a common baseline cooling level;
   for each disjoint set of processing devices that includes a first processing device determined to not be operating within the performance target and operating below the performance target for the set of two or more processing devices, generating, by the cooling system control device, a respective control signal to increase the cooling delivery to the disjoint set of processing devices to cause the performance of the first processing device to increase and be within the performance target for the set of two or more processing devices; and
   for each disjoint set of processing devices in which each processing device is determined to be operating within the performance target for the set of two or more processing devices, maintaining the cooling delivery.

10. The computer-implemented method of claim 9, further comprising:
    for each disjoint set of processing devices that includes a second processing device determined to not be operating within the performance target and above the performance target for the set of two or more processing devices set of two or more processing devices, maintaining the cooling delivery to the disjoint set of processing devices.

11. The computer-implemented method of claim 9, further comprising:
    for each disjoint set of processing devices that includes a second processing device determined to not be operating within the performance target and above the performance target for the set of two or more processing devices, generating, by the cooling system control device, a respective control signal to decrease the cooling delivery to the disjoint set of processing devices to cause the performance of the second processing device to decrease and be within the performance target for the set of two or more processing devices.

12. A system comprising:
    a data processing apparatus; and
    a non-transitory computer storage apparatus including a computer readable medium encoded with instructions that when executed by data processing apparatus cause the data processing apparatus to perform operations comprising:
    for each processing device in a set of two or more processing devices configured to perform a distributed task, wherein each processing device is thermally controlled by a cooling system that controls cooling to each processing device on an individual basis, determining whether the processing device is operating within a performance target for the set of two or more processing devices, the determining comprising:
  iteratively determining a load measure for the processing device, the load measure being indicative of a load on the processing device;
  for each iteration for which the load measures meet a threshold load measure, determining an operating frequency measure for the processing device; and
  determining whether the processing device is operating within a performance target for the set of two or more processing devices based one or more frequency measures of the processing device, wherein the performance target is a frequency range of a target operating frequency that is based on frequency measures obtained from the set of two or more processing devices operating at a common baseline cooling level;
for each processing device determined to not be operating within the performance target for the set of two or more processing devices, generating a respective control signal to adjust the cooling delivery to the processing device to cause the performance of the processing device to be within the performance target for the processing devices; and
for each processing device determined to be operating within the performance target for the set of two or more processing devices, maintaining the cooling delivery.

13. The system of claim 12, wherein:
determining whether the operating frequency measure of the processing device is within a frequency range of the target operating frequency comprises determining whether the operating frequency measure of the processing device is no less than a minimum percentage less than the target operating frequency; and
generating, by the cooling system control device, a respective control signal to adjust the cooling delivery to the processing device comprises generating a control signal to increase cooling delivery to the processing device.

14. The system of claim 12, wherein:
determining whether the operating frequency measure of the processing device is within a frequency range of the target operating frequency comprises determining whether the operating frequency measure of the processing device is greater than a minimum percentage less than the target operating frequency and less than a maximum percentage greater than the target operating frequency; and
generating a respective control signal to adjust the cooling delivery to the processing device comprises generating a first control signal to decrease cooling delivery to the processing device when the operating frequency is greater than a maximum percentage greater than the target operating frequency and generating a control signal to increase cooling delivery to the processing device when the operating frequency is less than a minimum percentage less than the target operating frequency.

15. A system comprising:
a data processing apparatus; and
a non-transitory computer storage apparatus including a computer readable medium encoded with instructions that when executed by data processing apparatus cause the data processing apparatus to perform operations comprising:
for each processing device in a set of two or more processing devices configured to perform a distributed task, wherein each processing device is thermally controlled by a cooling system that controls cooling to disjoint sets processing devices on a disjoint set basis, determining whether the processing device is operating within a performance target for the set of two or more processing devices the determining comprising, for each processing device:
  iteratively determining a load measure for the processing device, the load measure being indicative of a load on the processing device;
  for each iteration for which the load measures meet a threshold load measure, determining an operating frequency measure for the processing device; and
  determining whether the processing device is operating within a performance target for the set of two or more processing devices based one or more frequency measures of the processing device, wherein the performance target is a frequency range of a target operating frequency that is based on frequency measures obtained from the set of two or more processing devices operating at a common baseline cooling level;
for each disjoint set of processing devices that includes a first processing device determined to not be operating within the performance target and operating below the performance target for the set of two or more processing devices, generating a respective control signal to increase the cooling delivery to the disjoint set of processing devices to cause the performance of the first processing device to increase and be within the performance target for the set of two or more processing devices; and
for each disjoint set of processing devices in which each processing device is determined to be operating within the performance target for the set of two or more processing devices, maintaining the cooling delivery.

16. A non-transitory computer storage apparatus including a computer readable medium encoded with instructions that when executed by a data processing apparatus cause the data processing apparatus to perform operations comprising:
for each processing device in a set of two or more processing devices configured to perform a distributed task, wherein each processing device is thermally controlled by a cooling system that controls cooling to disjoint sets processing devices on a disjoint set basis, determining whether the processing device is operating within a performance target for the set of two or more processing devices the determining comprising, for each processing device:
  iteratively determining a load measure for the processing device, the load measure being indicative of a load on the processing device;
  for each iteration for which the load measures meet a threshold load measure, determining an operating frequency measure for the processing device; and
  determining whether the processing device is operating within a performance target for the set of two or more processing devices based one or more frequency measures of the processing device, wherein the performance target is a frequency range of a target operating frequency that is based on frequency measures obtained from the set of two or more processing devices operating at a common baseline cooling level;
for each disjoint set of processing devices that includes a first processing device determined to not be operating within the performance target and operating below the performance target for the set of two or more processing devices set of two or more processing devices, generating a respective control signal to increase the cooling delivery to the disjoint set of processing devices to cause the performance of the first processing device to increase and be within the performance target for the set of two or more processing devices; and for each disjoint set of processing devices in which each processing device is determined to be operating within the performance target for the set of two or more processing devices, maintaining the cooling delivery.

* * * * *